(12) United States Patent
Sahlin

(10) Patent No.: US 7,899,402 B2
(45) Date of Patent: Mar. 1, 2011

(54) DOPPLER ESTIMATION

(75) Inventor: Henrik Sahlin, Mölnlycke (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 259 days.

(21) Appl. No.: 11/721,580

(22) PCT Filed: Dec. 15, 2004

(86) PCT No.: PCT/IB2004/052815
§ 371 (c)(1),
(2), (4) Date: Sep. 11, 2009

(87) PCT Pub. No.: WO2006/064310
PCT Pub. Date: Jun. 22, 2006

(65) Prior Publication Data
US 2009/0325498 A1    Dec. 31, 2009

(51) Int. Cl.
*H04B 17/00*    (2006.01)
(52) U.S. Cl. .................... 455/67.11; 455/41.2; 375/280; 375/316
(58) Field of Classification Search ............... 455/67.11
See application file for complete search history.

(56) References Cited

U.S. PATENT DOCUMENTS 5,007,068 A * 4/1991 Simon et al. .................. 375/280
6,603,819 B1 * 8/2003 Myers .......................... 375/316

* cited by examiner

*Primary Examiner* — Duc Nguyen
*Assistant Examiner* — Ajibola Akinyemi
(74) *Attorney, Agent, or Firm* — Roger S. Burleigh

(57) ABSTRACT

Method of estimating Doppler spread comprising the steps of estimating a de-biased value according to the relation Formula (I), is a preliminary Doppler spread squared, based on measured parameters, and $K_2$ is a constant.

16 Claims, 5 Drawing Sheets

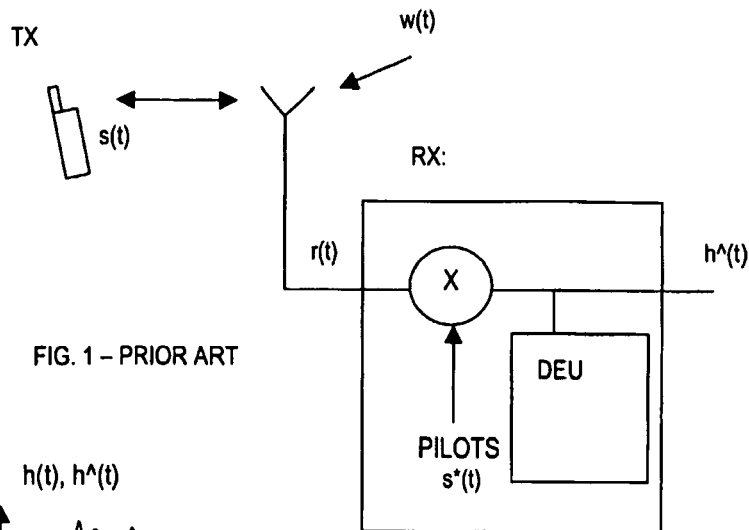
FIG. 1 – PRIOR ART
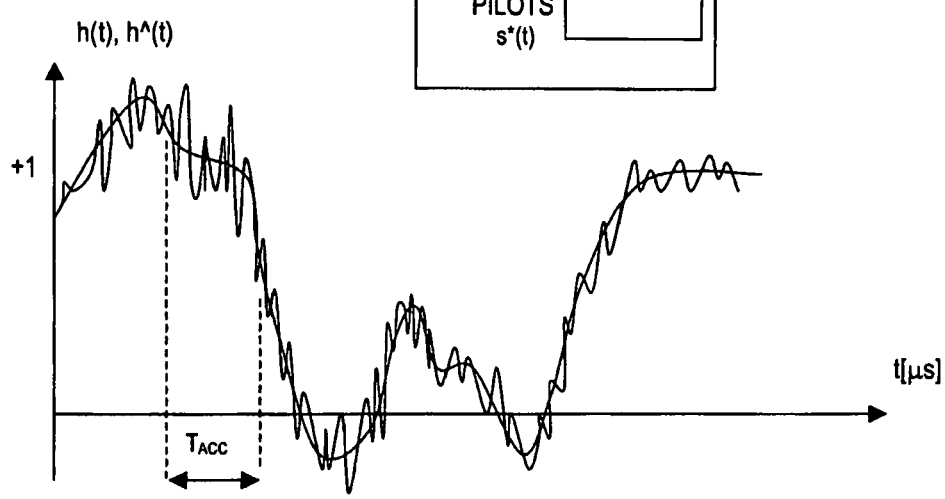
FIG. 2 – PRIOR ART
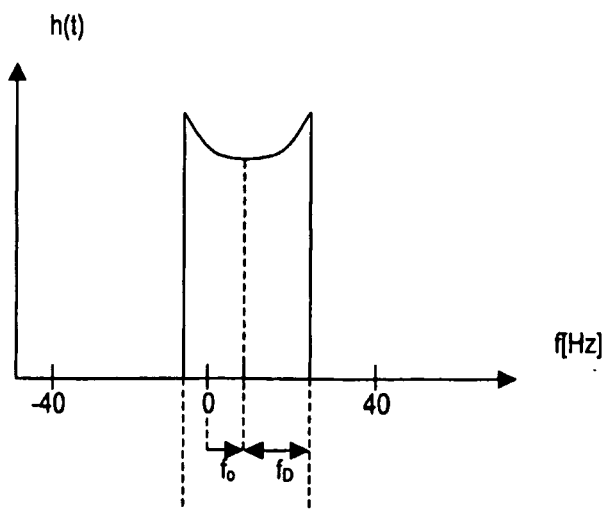
FIG. 3 – PRIOR ART

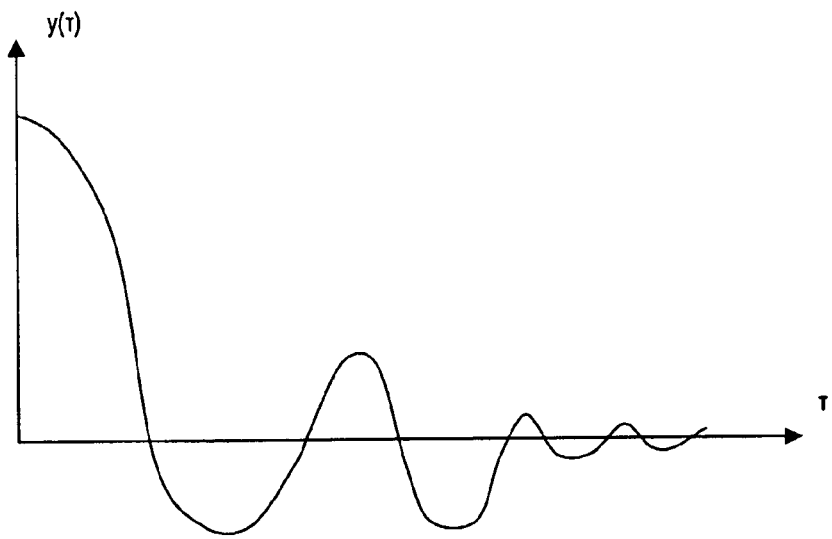
FIG. 4 – PRIOR ART
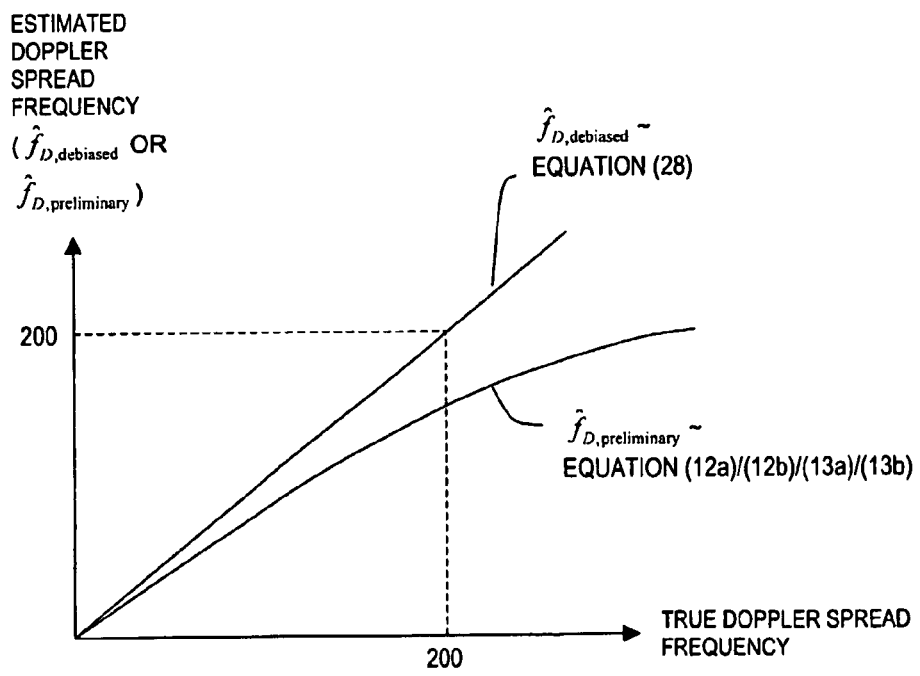
FIG. 5

DOPPLER ESTIMATION

FIELD OF THE INVENTION

The present invention relates to Doppler estimation in telecommunication systems and in the field of instrumentation and measurements.

BACKGROUND OF THE INVENTION

Doppler Deviation and Spread

When a transmitter moves relative to a receiver, the received signal will undergo the well known Doppler effect, that is, the amplitude of the received signal will change in proportion to the speed at which the receiver and the transmitter is moving in relation to one another.

In environments where line of sight communication cannot be obtained, multi-path fading is typically encountered as radio signals are scattered and reflected between various objects on the path from the transmitting antenna to the receiving antenna of a communication system.

Multipath fading environments, can be modeled by a channel having a spectrum as shown in FIG. 3, where the spectrum is centered around a frequency deviation $f_0$ of the received signal from the transmitted signal and with a width of the spectrum which is the Doppler spread, $2 f_D$.

This frequency deviation $f_0$ is due to errors in the modulation frequency between the transmitter and the receiver. This error might also depend on the Doppler spread if the receiver and transmitter have a line of sight propagation channel. A frequency estimation algorithm may be used to estimate of this deviation, such that the deviation might be removed, or compensated for, in the received signal.

The Doppler spread is due to diffuse components of the time varying channel, which is also referred to as fast fading. The Doppler spread is linearly proportional to the speed of the receiver and/or transmitter. When the receiver/transmitter does not move, the Doppler spread is zero.

A time varying channel with a spectrum as shown in FIG. 3 has an autocorrelation function as shown in FIG. 4, which corresponds to equation (6) given in the appended Table1.

Known Applications of Doppler Spread

For a radio communication system comprising a transmitter and a receiver, the antenna interfaces and air interfaces can be considered as a time varying channel h(t), where t is a time index. When a pilot signal s(t) is transmitted, the received signal over the antenna air interface can be written as $$r(t)=h(t)\cdot s(t)+w(t) \quad \text{I}$$

where w(t) is additive noise or interference from other transmitters than the one of interest.

At the receiver the signal r(t) can demodulated by pilot symbols conjugated s*(t). Then the time varying channel can be estimated according to the following well-known relation:

$$\hat{h}(t)=r(t)\cdot s^*(t)=h(t)+w(t)\cdot s^*(t) \quad \text{II}$$

The noise contribution may often be modeled as a white noise signal, i.e. a signal with a flat spectrum; an example in the time domain is shown in FIG. 2. Then the channel can be estimated more accurately by use of an integration or accumulation interval, $T_{ACC}$.

It can be shown that an optimum integration (or accumulation) interval, $T_{ACC}$, can be defined which depends on the Doppler spread. Hence for a receiver with good performance in terms of low bit error and block error rates, the accuracy of the Doppler spread estimation is crucial. A corresponding process has been shown in FIG. 7, wherein an integration interval $T_{ACC}$ is set in the receiver (step 1); a radio signal is received (step 2); a Doppler spread $f_D$ is estimated (step 3) and a new integration interval is set in the receiver based on the Doppler spread (step 4). The larger the Doppler spread, the shorter is the integration interval to be used.

Another exemplary application of a Doppler estimate is as means for predicting the quality of a radio link. By estimating the Doppler spread, the rate in which the quality of the radio link changes can be assessed.

A corresponding process has been shown in FIG. 8, whereby a quality measure is set for a communication channel (step 1); a radio signal is received (step 2) and a Doppler spread $f_D$ is estimated (step 3). A new quality measure of the communication channel is estimated (step 4) which may be done in independent order of the Doppler spread estimation (step 3). The estimated Doppler spread might be used in order to further process this quality measure (step 5) e.g. by calculating the speed of variations in the quality measure. A high Doppler spread indicates that the quality of the communication channel will change fast, such that new quality measures are not reliable for prediction. A low Doppler spread indicates that the quality of the communication channel will not change fast, such that new quality measures are reliable for prediction. Based on this quality measure of the communication channel, a new improved quality measure is set for the communication system (step 6).

Estimating Doppler Spread

In WO03/077445 a method for performing a Doppler spread estimation has been given. The corresponding expressions have been indicated in equation (12a) and (13a) in this application. Other similar expressions for the Doppler spread estimation have been indicated in equation (12b) and (13b), which are described in C. Tepedelenlioglu, A. Abdi, G. Giannakis, and M. Kaveh, "Estimation of Doppler spread and signal strength in mobile communications with applications to handoff and adaptive transmission," Wireless communications and Mobile Computing 2001:1: 221-242.

In FIG. 6, the estimation of the Doppler spread as performed under step 3) of the exemplary application of FIG. 7 or as performed under step 3) of the exemplary application of FIG. 8 has been indicated. In FIG. 6, first, autocorrelations are estimated for at least two lags of a received signal (step 10) for instance using equation 15 in table II. Subsequently, the "preliminary" (in this case final) Doppler spread is estimated (step 20) from the above estimated autocorrelations are estimated according to equations (12a), (12b), (13a) or (13b). These calculations may be performed in the Doppler estimation unit (DEU) of the receiver shown in FIG. 1. In this case y=$\hat{h}$(t) in equation (15).

However, the inventor of the present application has found that when estimating the Doppler spread using the above, or other comparable methods, the resulting estimates differ from the true value, $f_{DTRUE}$, with a systematic error—a bias.

Hence, for many applications where a Doppler spread estimate is required, the accuracy of known Doppler spread estimates leaves something to be desired in terms of accuracy.

SUMMARY OF THE INVENTION

It is a first object of the invention, to set forth method for estimating the Doppler spread more accurately.

This object has been accomplished by the subject matter set forth in claim 1.

Further advantages will appear from the following detailed description of the invention.

BRIEF DESCRIPTION OF THE DRAWINGS

FIG. 1 shows a prior art model of a transmitter and a receiver, the receiver providing a demodulated signal hˆ(t), FIG. 2 is a schematic representation of one example of a the demodulated signal hˆ(t), FIG. 3 shows an exemplary Jake's spectrum of due to Doppler frequency deviation and Doppler spread, FIG. 4 shows the autocorrelation function of the Doppler spread according to equation (6) of the prior art, FIG. 5 is a representation of a preliminary Doppler spread and de-biased Doppler spread value according to the invention.

DETAILED DESCRIPTION OF PREFERRED EMBODIMENTS OF THE INVENTION

Figure 6:
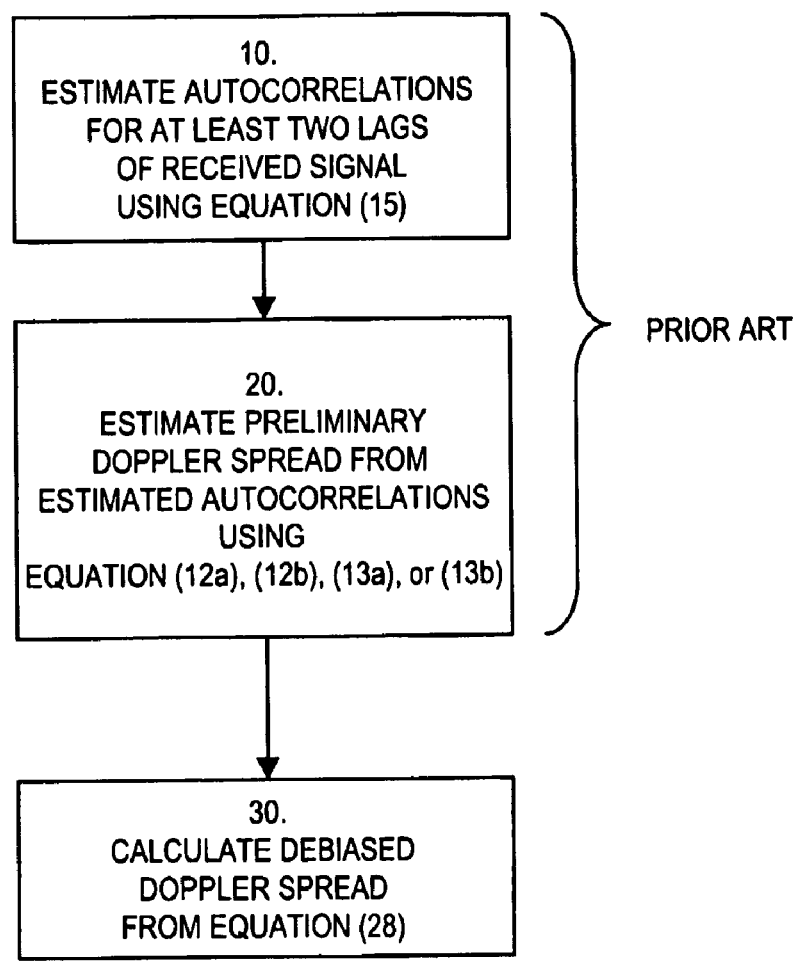
FIG. 6 shows a process for estimating a debiased Doppler spread according to the invention and the prior art, respectively.
Figure 7:
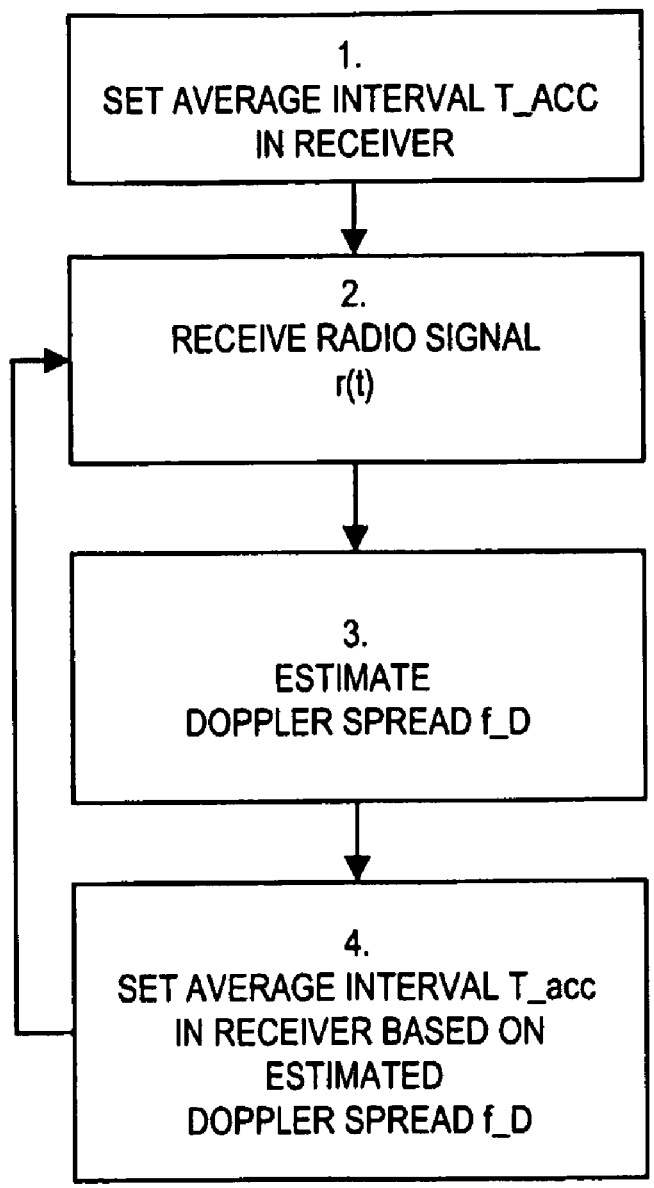
FIG. 7 shows a process for continuously adapting an averaging interval in a radio receiver.
Figure 8:
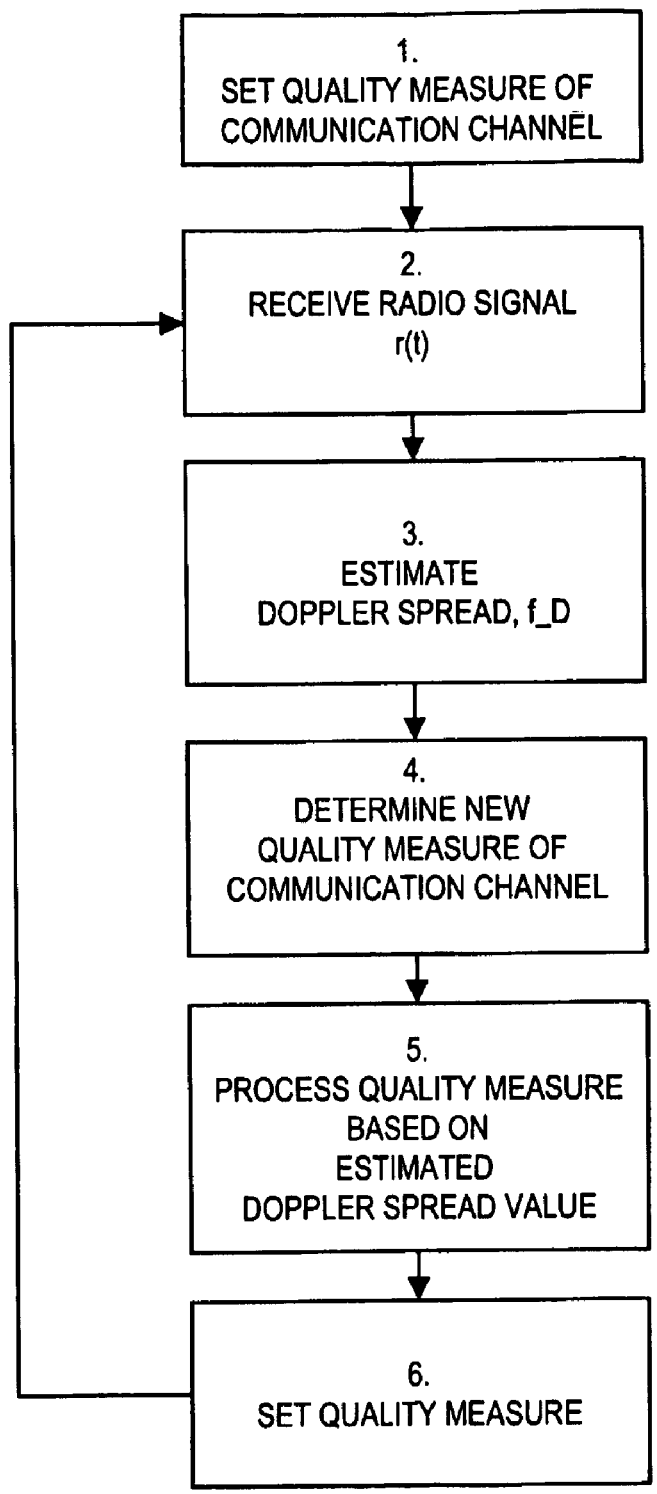
FIG. 8 shows a process for continuously estimating a quality measure of a radio channel.

In FIG. 5, the relation between the estimated (preliminary) Doppler spread, based on measured parameters, using expressions (12b) and (13b) above and the true Doppler spread has been indicated. As appears, a value, which increases with the Doppler, spread from $\hat{f}_{D,preliminary}$ to $\hat{f}_{D,debiased}$ has been found.

According to the invention, a de-biasing value $\Delta_2$ is estimated for compensating for the discrepancy between the (preliminary) estimated and the true Doppler spread.

The Doppler spread estimation according to the invention is done according to the following relation:

$$\hat{f}_{D,debiased}{}^2 = \hat{f}_{D,preliminary}{}^2 + K_2 \cdot \hat{f}_{D,preliminary}{}^4 + K_3 \cdot \hat{f}_{D,preliminary}{}^6 \quad \text{III}$$

Such that $$\hat{f}_{True} = \hat{f}_{D,debiased} \quad \text{IV}$$

where $\hat{f}_{D,preliminary}$, by way of example, is given by equation (12a), (12b), (13a) or (13b).

The above approximation gives a sufficient accuracy using the relation:

$$\hat{f}_{D,debiased}{}^2 = \hat{f}_{D,preliminary}{}^2 + K_2 \cdot \hat{f}_{D,preliminary}{}^4 \quad \text{V}$$

The basis for III shall now be explained in more detail with reference to the annexed tables I-IV forming part of this specification. Please note that the notation Xˆ corresponds to X in the present application.

Model

As mentioned above in connection with FIG. 1, a received demodulated signal (1), see table I-IV, may be modeled as the sum of a diffuse component, a line-of sight component and additive white Gaussian noise, where (2) is the power of the received signal, and (3) is the Ricean factor.

The received, demodulated, signal can thus be modeled as (4)

where (5)

is white additive Gaussian noise. This received signal has a correlation function (6)

with a spectrum (7).

When using (6) as an estimation of the first term in (6), the correlation at lag zero should be avoided since it contains a noise term.

Doppler Frequency Estimation

The following notations is used:

Doppler shift: (8)

Doppler spread: (9)

where (10)

is the power density spectrum of the received signal.

Maximum Doppler spread frequency: (11)

if received signal has a Jake's spectrum.

See FIG. 3 for an example of a Jake's spectrum relating to the received signal. The Doppler shift as defined in (8) may be Interpreted as the mean frequency of a received signal or centre of gravity of the spectrum. In FIG. 3, the exemplary Doppler shift equals 10 Hz.

Doppler Spread Estimator Example

For example, an estimation of the maximum Doppler spread can be calculated as:

(12a)

Without any frequency error, the imaginary part of the autocorrelation is zero. Then equation (12a) can be reformulated as in (12b)

in which a difference is calculated between an autocorrelation at lag zero and an autocorrelation calculated for a lag of T seconds. This difference is normalized by division with the autocorrelation at lag zero. A square root is taken of this quotient and the result is scaled with pi and the lag T in seconds.

In order to avoid using estimated auto correlation at lag zero, the following method is also suggested:

(13a)

Again, without any frequency error, the imaginary part of the autocorrelation is zero. Then, equation (13a) might be reformulated as (13b)

in which a difference is calculated between an autocorrelation at a minimum lag of T seconds and an autocorrelation calculated for another lag that is a multiple k of T seconds. This difference is normalized by division with the autocorrelation at lag T seconds, and by division with a numerator, which is, k squared minus one. A square root is taken of this quotient and the result is scaled with pi and the lag T in seconds.

These auto correlations of the received signal might be estimated as:

(14)

where (15)

is the sum over the pilot symbols. In this case the sampling interval of the autocorrelation, or the minimum lag is seconds, is (16).

Bias in Doppler Estimates

It may be shown that (17)

and (18)

are valid where (19)

and (20)

are used.

Approximations of these derivatives in (19) and (20) may be used as
(21)
and
(22a)
or
(22b)
where using (22a) results in (12a) and (22b) results in (13a).

For a specific Doppler frequency and sampling interval, the bias is:
(23a)
when using (22a)
and
(23b)
when using (22b)
Insert the zero order Bessel function:
(24)
into (20) resulting in
(25)
where (26) is used.

Then the Doppler spread de-biasing can be calculated as
(27a)
and
(27b).

Note that this debiasing is done of a squared value of the preliminary Doppler spread estimate. Also, the de-biasing use this squared value of the preliminary Doppler spread estimate.

To summarize, a Doppler estimation method is proposed which includes a de-biasing value as given in equations (28), (29), and (30) where either (31a) to (31d), or alternatively (32a) to (32d) are used.

According to the invention, a number of alternative ways of estimating the preliminary Doppler spread start estimate value, $\hat{f}_{D,preliminary}$, may be used as set out in equations (12a), (12b), (13a) and (13b).

According to the invention, the estimated Doppler spread may be calculated as indicated in FIG. 6 whereby the additional step (30) is performed based on for instance equation (28).

The Doppler spread estimation may for example be used to define an accumulation interval $T_{ACC}$ for decoding the received signal.

Another possible application of the Doppler spread estimation is as an estimate of the quality of the radio channel h(t).

According to the invention, a receiver (RX) for communicating with a transmitter (TX) has been set forth, the receiver comprising an demodulation unit (X) and a Doppler estimation unit (DEU), the Doppler estimation unit performing an estimation of the Doppler spread of the received signal.

TABLE I

| | |
|---|---|
| $y(n) = \frac{\sigma_h}{\sqrt{K+1}} \lim_{M \to \infty} \frac{1}{M} \sum_{m=1}^{M} e^{j(\omega_D \cos(\theta_m)n + \phi_m)} +$ $\sigma_h \sqrt{\frac{K}{K+1}} e^{j(\omega_D \cos(\theta_0)n + \phi_0)} + w(n)$ | (1) |
| $\sigma_h^2$ | (2) |
| K | (3) |
| y(n) = h(n) + w(n) | (4) |

TABLE I-continued

| | |
|---|---|
| w(n) | (5) |
| $r_y(\tau) = r_h(\tau) + \sigma_w^2 \delta(\tau)$ | (6) |
| $S_y(\omega) = S_h(\omega) + \sigma_w^2$ | (7) |
| $B^{(1)} = \frac{\int_{-\infty}^{\infty} f \phi_h(f) df}{\int_{-\infty}^{\infty} \phi_h(f) df}$ | (8) |
| $B^{(2)} = \sqrt{\frac{\int_{-\infty}^{\infty} (f - B^{(1)})^2 \phi_h(f) df}{\int_{-\infty}^{\infty} \phi_h(f) df}}$ | (9) |
| $\phi_h(f)$ | (10) |
| $f_D = \sqrt{2} \, B^{(2)}$ | (11) |
| $\hat{f}_{D,preliminary} = \frac{1}{\sqrt{2} \, \pi T} \sqrt{2 - \left(\frac{\text{Im}\{r_y(1)\}}{r_y(0)}\right)^2 - \frac{2\text{Re}\{r_y(1)\}}{r_y(0)}}$ | (12a) |
| $\hat{f}_{D,preliminary} = \frac{1}{\pi T} \sqrt{\frac{r_y(0) - \text{Re}\{r_y(1)\}}{r_y(0)}}$ | (12b) |
| $\hat{f}_{D,preliminary}(\kappa) =$ $\frac{1}{\sqrt{2} \, \pi T} \sqrt{\frac{2}{\kappa^2 - 1} - \left(\frac{\text{Im}\{r_y(1)\}}{\text{Re}\{r_y(1)\}}\right)^2 - \frac{2\text{Re}\{r_y(\kappa)\}}{(\kappa^2 - 1)\text{Re}\{r_y(1)\}}}$ | (13a) |
| $\hat{f}_{D,preliminary}(\kappa) = \frac{1}{\pi T} \sqrt{\frac{\text{Re}\{r_y(1)\} - \text{Re}\{r_y(\kappa)\}}{(\kappa^2 - 1)\text{Re}\{r_y(1)\}}}$ | (13b) |

TABLE II

| | |
|---|---|
| $r_y(k) = \frac{1}{M} \sum_{m=0}^{M} \bar{y}(m - k) \bar{y}^*(m)$ | (14) |
| $\bar{y}(m) = \frac{1}{N_{Pilots}} \sum_{n=0}^{N_{Pilots}-1} y(10 \cdot m + n)$ | (15) |
| T = 1/1500 seconds. | (16) |
| $B^{(1)} = \frac{1}{2\pi j} \frac{r'_h(0)}{r_h(0)}$ | (17) |
| $B^{(2)} = \frac{1}{2\pi} \sqrt{\left(\frac{r'_h(0)}{r_h(0)}\right)^2 - \frac{r''_h(0)}{r_h(0)}}$ | (18) |
| $r'_h(0) = \left.\frac{\partial}{\partial \tau} r_h(\tau)\right|_{\tau=0}$ | (19) |
| $r''_h(0) = \left.\frac{\partial^2}{\partial \tau^2} r_h(\tau)\right|_{\tau=0}$ | (20) |
| $r'_h(0) = \lim_{T \to 0} \frac{j\text{Im}\{r_h(T)\}}{T} \approx \frac{j\text{Im}\{r_y(1)\}}{T_s}$ | (21) |
| $r''_h(0) = \lim_{T \to 0} \frac{2\text{Re}\{r_h(T) - r_h(0)\}}{T^2} \approx \frac{2\text{Re}\{r_y(1) - r_y(0)\}}{T_s^2}$ | (22a) |

TABLE II-continued $$r_h''(0) = \lim_{T\to 0} \frac{2\text{Re}\{r_h(T\kappa) - r_h(T)\}}{(\kappa^2-1)T^2} \approx \frac{2\text{Re}\{r_y(\kappa) - r_y(1)\}}{(\kappa^2-1)T_s^2} \quad (22b)$$

$$\Delta_2 = r_h''(0) - \frac{2\text{Re}\{r_h(T_s) - r_h(0)\}}{T_s^2} \quad (23a)$$

$$\Delta_2 = r_h''(0) - \frac{2\text{Re}\{r_h(T_s\kappa) - r_h(T_s)\}}{(\kappa^2-1)T_s^2} \quad (23b)$$

TABLE III $$J_0(x) = \sum_{k=0}^{\infty} \frac{(-1)^k}{(k!)^2}\left(\frac{x}{2}\right)^{2k} \quad (24)$$

$$r_h''(0) = \left.\frac{\partial^2}{\partial m^2}J_0(m\omega_D)\right|_{m=0} = -\frac{1}{2T^2}\omega_D^2 \quad (25)$$

$$\omega_D = 2\pi f_D \quad (26)$$

$$\Delta_2 = r_h''(0) + \frac{-2\text{Re}\{r_h(T_s) - r_h(0)\}}{T^2} \quad (27a)$$

$$= \frac{1}{T^2}\left(-\frac{1}{2}\omega_D^2 - 2(J_0(\omega_D) - J_0(0))\right)$$

$$= \frac{1}{T^2}\left(-\frac{1}{2}\omega_D^2 - 2\left(-\left(\frac{\omega_D}{2}\right)^2 + \frac{1}{(2!)^2}\left(\frac{\omega_D}{2}\right)^4 - \frac{1}{(3!)^2}\left(\frac{\omega_D}{2}\right)^6 + \ldots\right)\right)$$

$$= -\frac{2}{T^2(2!)^2 2^4}\omega_D^4 + \frac{2}{T^2(3!)^2 2^6}\omega_D^6$$

$$\Delta_2 = r_h''(0) - \frac{2\text{Re}\{r_h(T_s\kappa) - r_h(T_s)\}}{(\kappa^2-1)T_s^2} \quad (27b)$$

$$= -\frac{2}{(\kappa^2-1)T^2}\left(-\frac{\omega_D^4(\kappa^4-1)}{2^2 2^4} + \frac{\omega_D^6(\kappa^6-1)}{6^2 2^6} + \ldots\right)$$

TABLE IV $$\hat{f}_{D,debiased}^2 = \hat{f}_{D,preliminary}^2 + \Delta_2 \quad (28)$$

$$\Delta_2 = K_2(\hat{f}_{D,preliminary}^2)^2 + K_3(\hat{f}_{D,preliminary}^2)^3 + \ldots + K_m(\hat{f}_{D,preliminary}^2)^m + \ldots \quad (29)$$

$$\hat{f}_{D,debiased}(\kappa) = \sqrt{\hat{f}_{D,debiased}^2} \quad (30)$$

$$\hat{f}_{D,preliminary}^2 = \frac{\text{Re}\{r_y(0)\} - \text{Re}\{r_y(1)\}}{\pi^2 T_s^2 \text{Re}\{r_y(0)\}} \quad (31a)$$

$$K_2 = -\frac{2}{2^2 2^4} \quad (31b)$$

$$K_3 = \frac{2}{6^2 2^6} \quad (31c)$$

$$K_m = \frac{(-1)^{(m-1)} 2}{(m!)^2 2^{2m}} \quad (31d)$$

TABLE IV-continued $$\hat{f}_{D,preliminary}^2 = \frac{\text{Re}\{r_y(1)\} - \text{Re}\{r_y(\kappa)\}}{\pi^2 T_s^2 (\kappa^2 - 1)\text{Re}\{r_y(1)\}} \quad (32a)$$

$$K_2 = -\frac{2}{(\kappa^2-1)}\frac{(\kappa^4-1)}{2^2 2^4} \quad (32b)$$

$$K_3 = \frac{2}{(\kappa^2-1)}\frac{(\kappa^6-1)}{6^2 2^6} \quad (32c)$$

$$K_m = (-1)^{(m-1)}\frac{2}{(\kappa^2-1)}\frac{(\kappa^{2m}-1)}{(m!)^2 2^{2m}} \quad (32d)$$

The invention claimed is:

1. A method for estimating Doppler spread, comprising the step of:
   estimating by a radio frequency receiver a de-biased value according to the relation $$\hat{f}_{D,debiased}^2 = \hat{f}_{D,preliminary}^2 + K_2 \hat{f}_{D,preliminary}^4$$

wherein $\hat{f}_{D,preliminary}^2$ is a preliminary Doppler spread squared, based on measured parameters, and $K_2$ is a constant.

2. The method according to claim 1, wherein $K_2$ is determined according to $$K_2 = -\frac{2}{2^2 2^4} = -\frac{1}{32}.$$

3. The method according to claim 2, wherein the squared preliminary Doppler spread is estimated by calculating a difference between an autocorrelation at lag zero and an autocorrelation calculated for a lag of T seconds, the difference being normalized by division with the autocorrelation at lag zero and scaled the result with pi squared and the lag T in seconds squared.

4. The method according to claim 3, wherein the squared preliminary Doppler spread is estimated more specifically by:

$$\hat{f}_{D,preliminary}^2 = \frac{1}{\pi^2 T^2}\frac{r_y(0) - \text{Re}\{r_y(1)\}}{r_y(0)}.$$

5. The method according to claim 1, wherein the squared preliminary Doppler spread is estimated by calculating a difference between an autocorrelation at a minimum lag of T seconds and an autocorrelation calculated for another lag which is a multiple k of T seconds, the difference being normalized by division with the autocorrelation at lag T seconds and by division with a numerator which is k squared minus one, the quotient being scaled with pi squared and the lag T in seconds squared.

6. The method according to claim 5, wherein the squared preliminary Doppler spread is estimated more specifically by:

$$\hat{f}_{D,preliminary}^2 = \frac{1}{\pi^2 T^2}\frac{\text{Re}\{r_y(1) - r_y(k)\}}{\text{Re}\{r_y(1)\}(k^2-1)}.$$

7. The method according to claim 1, wherein $K_2$ is determined according to:

$$K_2 = \frac{2(\kappa^4 - 1)}{(\kappa^2 - 1)2^2 2^4}$$

where K is an integer.

8. The method according to claim 1, further comprising the steps step of
estimating a de-biased value according to the relation:

$$\hat{f}_{D,debiased}{}^2 = \hat{f}_{D,preliminary}{}^2 + K_2 \hat{f}_{D,preliminary}{}^4 + K_3 \cdot \hat{f}_{D,preliminary}{}^6 + \ldots + K_m \hat{f}_{D,preliminary}{}^{2m}$$

wherein $\hat{f}_{D,preliminary}{}^2$ is a preliminary Doppler spread squared, based on measured parameters, and $K_2$, $K_3$ and $K_m$ are constants.

9. The method according to claim 8, wherein $K_m$ is determined according to $$K_i = (-1)^{i-1} \frac{2}{(i!)^2 2^{2i}},$$

for i=2, 3, ..., m.

10. The method according to claim 8, wherein $K_m$ is determined according to $$K_i = (-1)^{i-1} \frac{2}{(\kappa^2 - 1)} \frac{(\kappa^{2i} - 1)}{(i!)^2 2^{2i}}$$

for i=2, 3, ... m, where K is an integer.

11. A radio frequency receiver comprising a Doppler estimation unit, said Doppler estimation unit comprising:
means for estimating a de-biased value according to the relation:

$$\hat{f}_{D,debiased}{}^2 = \hat{f}_{D,preliminary}{}^2 + K_2 \hat{f}_{D,preliminary}{}^4 + K_3 \cdot \hat{f}_{D,preliminary}{}^6 + \ldots + K_m \hat{f}_{D,preliminary}{}^{2m}$$

wherein $\hat{f}_{D,preliminary}{}^2$ is a preliminary Doppler spread squared, based on measured parameters, and $K_2$, $K_3$ and $K_m$ are a constants.

12. The receiver according to claim 11, wherein $K_m$ is determined according to $$K_i = (-1)^{i-1} \frac{2}{(i!)^2 2^{2i}},$$

for i=2, 3, ..., m.

13. The receiver according to claim 11, wherein $K_m$ is determined according to $$K_i = (-1)^{i-1} \frac{2}{(\kappa^2 - 1)} \frac{(\kappa^{2i} - 1)}{(i!)^2 2^{2i}}$$

for i=2, 3, ..., m, where K is an integer.

14. A radio frequency receiver, comprising:
a Doppler estimation unit for performing an estimation of a Doppler spread of a received signal, said unit operative to estimate a de-biased value according to the relation:

$$\hat{f}_{D,debiased}{}^2 = \hat{f}_{D,preliminary}{}^2 + K_2 \hat{f}_{D,preliminary}{}^4$$

wherein $\hat{f}_{D,preliminary}{}^2$ is a preliminary Doppler spread squared, based on measured parameters, and $K_2$ is a constant.

15. The receiver according to claim 14, wherein the Doppler spread estimation is used to define an accumulation interval for decoding the received signal.

16. The receiver according to claim 14, wherein the Doppler spread estimation is used to estimate the quality of the radio channel.

* * * * *

UNITED STATES PATENT AND TRADEMARK OFFICE
CERTIFICATE OF CORRECTION

PATENT NO. : 7,899,402 B2
APPLICATION NO. : 11/721580
DATED : March 1, 2011
INVENTOR(S) : Sahlin It is certified that error appears in the above-identified patent and that said Letters Patent is hereby corrected as shown below:

In Column 1, Line 25, delete "$f_0$" and insert -- $f_o$ --, therefor.

In Column 1, Line 28, delete "$f_0$" and insert -- $f_o$ --, therefor.

In Column 3, Lines 39-41, delete
" $\hat{f}_{D,debiased}{}^2 = \hat{f}_{D,preliminary}{}^2 + K_2 \hat{f}_{D,preliminary}{}^4 + K_3 \cdot \hat{f}_{D,preliminary}{}^6$ " and insert -- $\hat{f}_{D,debiased}{}^2 = \hat{f}_{D,preliminary}{}^2 + K_2 \cdot \hat{f}_{D,preliminary}{}^4 + K_3 \cdot \hat{f}_{D,preliminary}{}^6 \cdots$ --, therefor.

In Column 4, Line 18, delete "Interpreted" and insert -- interpreted --, therefor.

In Column 7, Line 48, in Equation (28), delete " $\hat{f}^2_{D,debiased} = \hat{f}^2_{D,preliminary} + \Delta_2$ "

and insert -- $\hat{f}^2_{D,debiased} = \hat{f}^2_{D,preliminary} + \Delta_2$ --, therefor.

In Column 7, Line 50, in Equation (29), delete " $\Delta_2 = K_2(\hat{f}^2_{D,preliminary})^2 + K_3(\hat{f}^2_{D,preliminary})^3$ " and insert -- $\Delta_2 = K_2(\hat{f}^2_{D,preliminary})^2 + K_3(\hat{f}^2_{D,preliminary})^3$ --, therefor.

In Column 7, Line 54, in Equation (30), delete " $\hat{f}_{D,debiased}(\kappa) = \sqrt{\hat{f}^2_{D,debiased}}$ " and insert -- $\hat{f}_{D,debiased}(\kappa) = \sqrt{\hat{f}^2_{D,debiased}}$ --, therefor.

Signed and Sealed this
Twenty-third Day of August, 2011

David J. Kappos
*Director of the United States Patent and Trademark Office*

CERTIFICATE OF CORRECTION (continued)
U.S. Pat. No. 7,899,402 B2

In Column 9, Lines 3-4, in Claim 7, delete "$K_2 = \frac{2(\kappa^4 - 1)}{(\kappa^2 - 1)2^2 2^4}$" and insert -- $K_2 = -\frac{2(\kappa^4 - 1)}{(\kappa^2 - 1)2^2 2^4}$ --, therefor.

In Column 9, Line 6, in Claim 7, delete "K" and insert -- κ --, therefor.

In Column 9, Line 8, in Claim 8, delete "steps step of" and insert -- step of: --, therefor.

In Column 9, Lines 11-12, in Claim 8, delete "$\hat{f}_{D,debiased}{}^2 = \hat{f}_{D,preliminary}{}^2 + K_2 \hat{f}_{D,preliminary}{}^4 + K_3 \cdot \hat{f}_{D,preliminary}{}^6 \cdots K_m \hat{f}_{D,preliminary}{}^{2m}$" and insert -- $\hat{f}_{D,debiased}{}^2 = \hat{f}_{D,preliminary}{}^2 + K_2 \cdot \hat{f}_{D,preliminary}{}^4 + K_3 \cdot \hat{f}_{D,preliminary}{}^6 \cdots + K_m \cdot \hat{f}_{D,preliminary}{}^{2m}$ --, therefor.

In Column 9, Line 30, in Claim 10, delete "K" and insert -- κ --, therefor.

In Column 10, Line 3, in Claim 11, delete "are a" and insert -- are --, therefor.

In Column 10, Lines 17-18, in Claim 13, delete "$\frac{2}{(K^2 - 1)} \frac{(\kappa^{2i} - 1)}{(i!)^2 2^{2i}}$" and insert -- $\frac{2}{(K^2 - 1)} \frac{(\kappa^{2i} - 1)}{(i!)^2 2^{2i}}$ --, therefor.

In Column 10, Line 20, in Claim 13, delete "K" and insert -- κ --, therefor.